United States Patent [19]

Nuckolls et al.

[11] Patent Number: 4,686,424
[45] Date of Patent: Aug. 11, 1987

[54] EMERGENCY LIGHTING CIRCUITS

[75] Inventors: Joe A. Nuckolls, Blacksburg; Kerry G. Evans, Christiansburg, both of Va.

[73] Assignee: Harvey Hubbell Incorporated, Orange, Conn.

[21] Appl. No.: 820,723

[22] Filed: Jan. 21, 1986

[51] Int. Cl.⁴ .......................................... H05B 37/00
[52] U.S. Cl. ...................................... 315/86; 315/87; 315/90
[58] Field of Search .............................. 315/86, 88, 90

[56] References Cited

U.S. PATENT DOCUMENTS

| | | | |
|---|---|---|---|
| 3,486,068 | 12/1969 | Dunn et al. | 315/87 |
| 3,659,179 | 4/1972 | Barker et al. | 315/87 |
| 3,833,817 | 9/1974 | Patel | 307/66 |
| 4,030,013 | 6/1977 | Watrous | 320/59 |
| 4,057,750 | 11/1977 | Elms et al. | 315/86 |
| 4,216,410 | 8/1980 | Feldstein | 315/86 |
| 4,323,820 | 4/1982 | Teich | 315/86 |
| 4,454,452 | 6/1984 | Feldstein | 315/86 |

Primary Examiner—Harold Dixon
Attorney, Agent, or Firm—Jerry M. Presson; Walter C. Farley

[57] ABSTRACT

An emergency lighting circuit includes a lamp which can be energized by a battery-inverter circuit upon power failure. The battery is connected to the inverter circuit and the lamp by operation of a relay which is connected to the rectifier supplying charging current to the battery. The rectifier is connected across the line in series with a ballast reactor. The circuit can be used as emergency lighting only or the lamp can be employed for normal lighting purposes and switched to the inverter power when line voltage is interrupted.

9 Claims, 3 Drawing Figures

FIG. I.

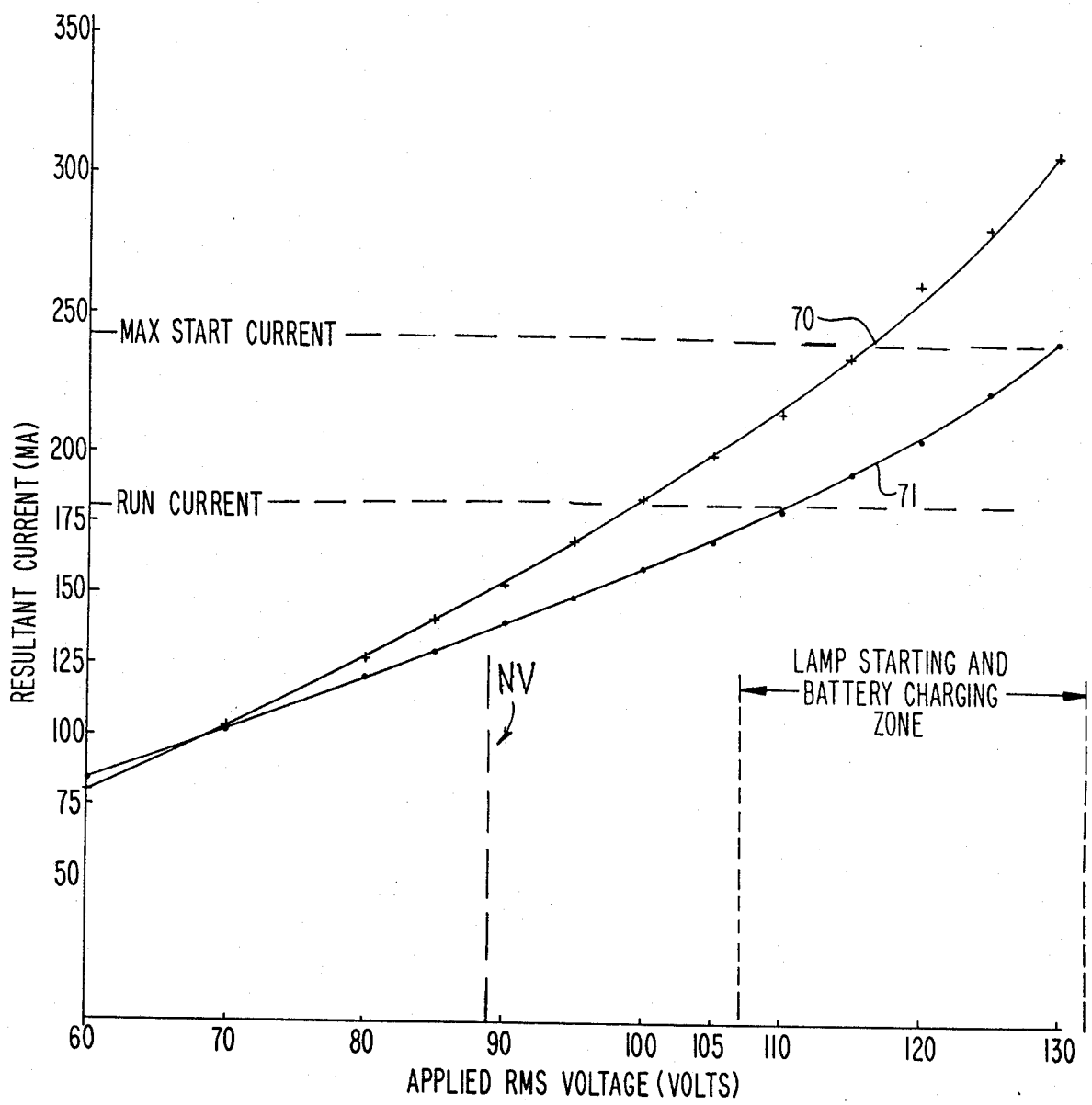

EMERGENCY LIGHTING CIRCUITS

This invention relates to electrical circuits for providing energy to an emergency light in the event of power interruption.

BACKGROUND OF THE INVENTION

An emergency lighting device, in the context of the present invention, is a device which is capable of energizing a lamp when the power to the usual illumination equipment fails. Usually, such devices include a battery, some form of voltage sensing device and a separate lamp, not necessarily part of the normal illumination system, which is electrically connected to the battery only when normal power fails or, in some cases, for test purposes.

In recent years, more attention has been directed to devices which have characteristics making them suitable for use in lighting systems which employ fluorescent and other gas discharge lamps. Additionally, it has been recognized that it is practical to use some of the normal illumination lamps for emergency lighting by fitting selected fluorescent fixtures with special circuits and batteries for operating those fixtures from normal power when it is available and from the batteries when normal power fails.

Examples of circuits for performing these kinds of functions are shown in the following U.S. Pat. Nos.: 3,833,817 to Patel; 4,030,013 to Watrous; 4,216,410 to Feldstein; 4,323,820 to Teich; 4,454,452 to Feldstein.

A review of these reveals that the circuits disclosed therein are generally quite complicated and are also rather expensive to produce because of the relatively large number of components required and the nature of those components. It is also apparent that these circuits do not make most efficient use of battery power, thereby shortening the time emergency illumination can be supplied. This can be a serious shortcoming in the event of an extended power failure.

SUMMARY OF THE INVENTION

Accordingly, an object of the present invention is to provide an emergency lighting device which can be connected to new or existing lighting systems to reliably provide illumination in the event of power interruption. A further object is to provide such a device which meets code requirements, is considerably more energy efficient than prior devices, and allows the use of mixed light source types.

Briefly, the invention comprises an emergency light circuit comprising first and second conductors connectable to an AC line voltage source, a discharge lamp having two terminals, and a high frequency inverter circuit having an input and an output. First circuit means is provided for connecting the lamp to the output of the inverter circuit and to the second conductor. A rechargeable battery is connected to the input of the inverter circuit by second circuit means including a normally closed relay contact so that the DC from the battery can be converted to AC for energizing the lamp when the contact set is closed. A full wave rectifier has an input and an output connected to the battery. A ballast reactor is connected in series circuit relationship with the input of the rectifier between the first and second conductors and a relay winding, operatively associated with the contact set, is connected to the rectifier. The relay winding is energized so that the contact set is open when rectifier current flows to provide charging current to the battery, the contact set being closed in the absence of battery charging current to connect the battery to the inverter for energizing the lamp.

The circuit can be used alone, or can be used in conjunction with other lamps having their own ballast devices, the other lamps being energized only when line voltage is available.

In order to impart full understanding of the manner in which these and other objectives are attained in accordance with the invention, particularly advantageous embodiments thereof will be described with reference to the accompanying drawings, which form a part of this specification, and wherein:

FIG. 3 is a volt-ampere curve of characteristics of a reactor usable in the circuits of FIGS. 1 or 2.

DETAILED DESCRIPTION OF PREFERRED EMBODIMENTS

Figure 1:
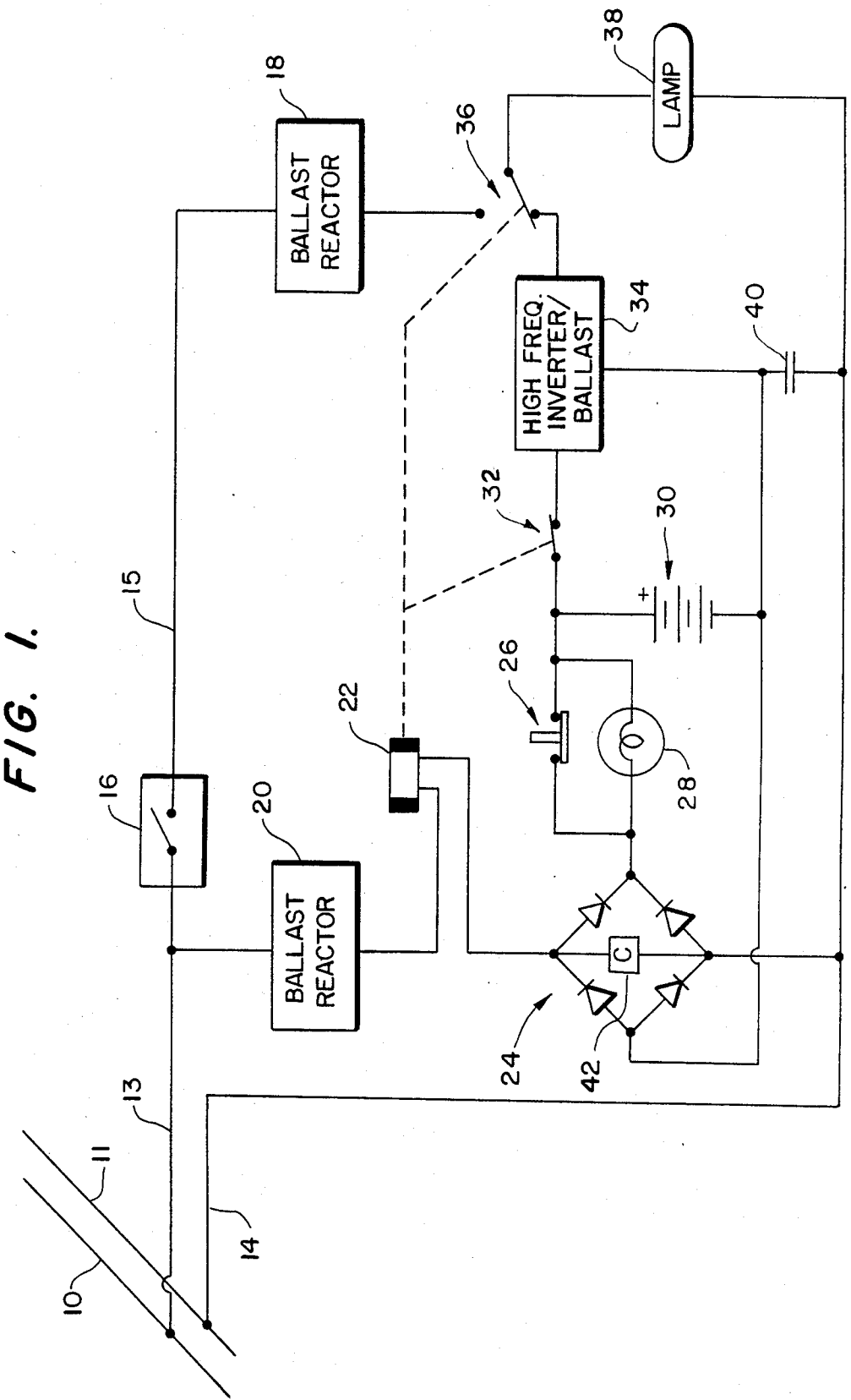
FIG. 1 is a schematic circuit diagram, partly in block form, of a first embodiment of an emergency lighting circuit in accordance with the invention.

Referring first to FIG. 1, this lighting circuit in accordance with the present invention is connected to conventional power lines 10 and 11, normally at 120 v. AC, by first and second conductors 13 and 14. Conductor 13 is connected to one side of a switch 16, which can be a conventional wall switch, the other side of which is connected through a conductor 15 to a ballast reactor 18. Conductor 13 is also connected to one side of a ballast reactor 20, the other side of which is connected to one terminal of the energizing winding of a low-voltage, AC electromagnetic relay 22. The other side of the winding of relay 22 is connected to one input terminal of a full-wave diode rectifier circuit indicated generally at 24, the other side of which is connected to conductor 14.

One output of rectifier 24 is connected to a parallel circuit including a normally closed, manually operable test switch indicated generally at 26 which is in parallel with a lamp 28. The other side of this parallel circuit is connected to the positive terminal of a rechargeable battery 30 and to one side of a normally closed contact set 32 which is operated by energization of the winding of relay 22. The other side of contact set 32 is connected to the input of a high frequency inverter/ballast circuit 34, the output of which is connected to one contact of a single-pole, double-throw contact set indicated generally at 36 which is also operated by energization of the winding of relay 22. The movable contact of contact set 36 is connected to one side of a lamp 38 and the other fixed contact of contact set 36 is connected to the remaining terminal of ballast reactor 18. The other side of lamp 38 is connected to conductor 14. The negative side of battery 30 and the common terminal of inverterballast circuit 34 are connected, along with the other output terminal of rectifier 24 therefore and through a capacitor 40 to neutral conductor 14.

One advantage of the circuit according to FIG. 1 is that reactors 18 and 20 can be devices which are identical to each other and which are relatively high efficiency linear reactors as compared with conventional reactors on the market for ballast purposes. Standard reactors are linear up to about 95 VRMS across the reactor. Above that level, saturation begins and the waveform from the reactor includes harmonics which tend to damage semiconductor devices with which they are used as well as the internal components of the battery. By designing and constructing the reactors so that they have the same reactance (selected, as is customary, to operate properly with the specific type of lamp) but are made with a large number of turns, better steel and a larger air gap so as to be linear up to at least 132 VRMS (line voltage plus 10%), several advantages result. One is that the reactor operates with better efficiency with the lamp and tends to lengthen lamp life. Another is that the same reactor can be used with the semiconductor components and for battery charging. A typical characteristic for the reactor is shown in FIG. 3. By arranging the circuit so that identical reactor devices can be used, a considerable cost saving is achieved in not needing to produce different types of reactive devices.

The V-A characteristic for a typical standard ballast is shown in FIG. 3 by the curve 70 and an example of the characteristics of a linear ballast designed for use in the present system is shown at curve 71. It will be noticed that curve 71 is somewhat more linear, especially in the region in which lamp starting and battery charging takes place. The present current change from 70 to 130 volts is about 199% with the standard ballast and 137% with the more linear device. Also identified in FIG. 3 are the normal operating voltage across the reactor, NV, and the current at which the lamp runs and the maximum lamp start current.

A further advantage of the circuit is that a single electromagnetic relay with two contact sets can be used. Furthermore, because the relay is arranged in series circuit relationship with reactor 20, which acts as a current limiting device and which exhibits considerable voltage drop, and with rectifier 24, the relay can be a low-voltage AC relay of a rather inexpensive and highly reliable type.

Lamp 38 can be any of several different types of gas discharge lamps requiring no separate filament heating circuit. The circuit of FIG. 1 can be used as an emergency light source only or can be combined in a conventional fixture with one or more other lamps, connected between conductors 14 and 15, with their own reactors. Again, the reactors can be identical to 18 and 20. If desired, lamp 38 can be of a different type from the other lamps used in the same fixture, producing light of a different color, thereby providing an indication of the fact that the power has been lost, even while maintaining a suitably high illumination level. The circuit can be used with PL fluorescent lamps, HPS or metal halide lamps with appropriate choices of reactor size and inverter ballast output.

In operation, when line voltage is present, voltage is applied to the series circuit including ballast reactor 20, relay winding 22, and rectifier 24, keeping relay 22 energized so that contact set 32 is open and contact set 36 is in the position opposite that shown in FIG. 1. With wall switch 16 closed, voltage is applied to the series circuit of ballast reactor 18 and lamp 38, energizing the lamp and also energizing any other lamps which might be connected in parallel with that series circuit.

Meanwhile, rectifier 24 is supplying charging current through switch 26 to battery 30, charging the battery or maintaining its charge. Because contact set 32 is open, no voltage is applied to the high frequency inverter/ballast circuit.

In the event of a power interruption, the energizing voltage for relay 22 is removed, allowing contact set 32 to close and allowing contact set 36 to return to the position shown in FIG. 1. Under those conditions, battery 30 supplies DC power to circuit 34, allowing that circuit to supply energy to lamp 38, the circuit for the inverter including capacitor 40 which functions to complete the high frequency path and also to block 60 Hz. energy from the inverter when line voltage is present since such voltage could damage the inverter circuit.

This circuit is particularly reliable because the inductive device 20 is placed between the AC supply and the battery-charging semiconductor components which are sensitive to surge and transient phenomena. This also permits the use of a clamping device 42 which is connected across the input terminals of a recifier 24 to more closely control the voltage or voltage cut-off which is supplied to the battery. Device 42 can be a varistor or a Zener diode, for example. The presence of the ballast device and relay in the positions shown also allows the use of a low cost, low voltage bridge and further moderates the inrush currents when the circuit is first energized, the charging current waveform spiking which would lead to degredation and excess heating of the semiconductor, the battery, the high frequency inverter ballast and relay contacts. The circuit power losses are minimized and the battery charging current more compatibly controlled and limited than in capacitor or resistor current limiting circuits 34.

Still further, the inductor used in this fashion eliminates the need for a step-down transformer which substantially reduces the cost as well as the weight of the entire circuit. As previously mentioned, a single relay of a relatively inexpensive and low voltage type is employed.

The inverter circuit is of a commercially available type which receives DC and produces a high frequency output. By "high frequency" is meant a frequency which is significantly higher than the 60 Hz. line frequency and is normally in the order of 20 kHz. A suitable inverter/ballast circuit if model ID12-1-7/9 made by Iota Engineering Co., Tuscon, Ariz. 85714, although others can be used.

Figure 2:
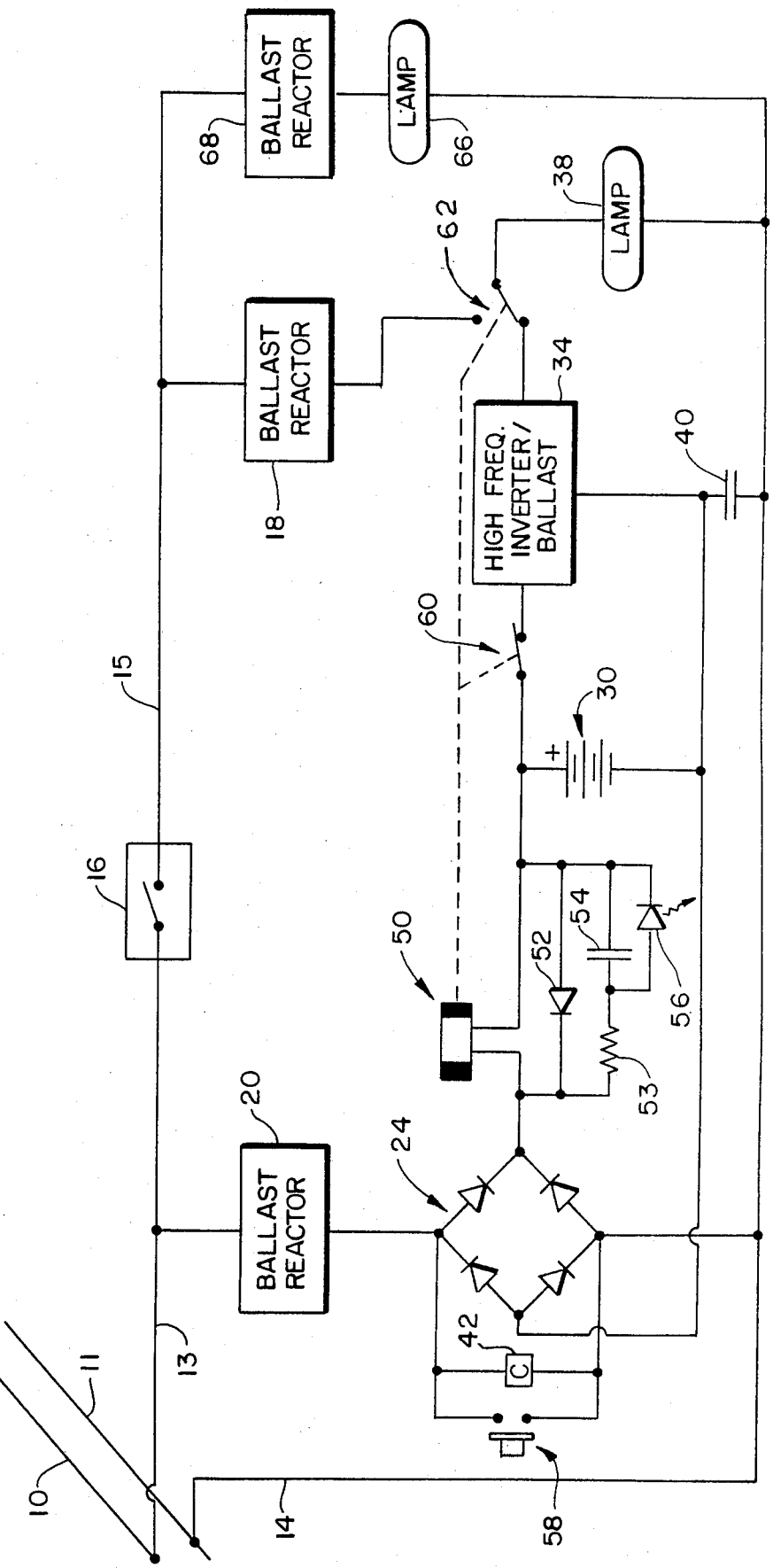
FIG. 2 is a schematic circuit diagram, partly in block form, of a second embodiment of an emergency lighting circuit in accordance with the invention.

A further embodiment of the invention is shown in FIG. 2 in which those portions which are the same as FIG. 1 are similarly numbered. In the circuit of FIG. 2, ballast reactor 20 is connected directly in series circuit relationship with the input terminals of full wave rectifier 24 which, again, has a clamping device 42 connected in parallel, the series circuit being connected between conductors 13 and 14. The output terminals of the rectifier are connected to a circuit which includes the energizing winding of a low-voltage, DC relay 50. The winding of relay 50 is in series between the rectifier and the positive terminal of battery 30, the negative terminal of which is connected to the other side of the rectifier. In parallel circuit relationship with relay 50 is a diode 52 and also a series circuit including a resistor 53 and a capacitor 54. In parallel with the capacitor is a light emitting diode 56 which acts as a test or indicator light in cooperation with a normally open, manually operable push-button test switch generally indicated at 58 which is connected across the rectifier input. When test switch 58 is closed, the lamp goes out, providing a test of the charging circuit.

When power is lost, the output of the battery is delivered through a normally closed contact set 60 to the input terminal of a high-frequency inverter-ballast circuit 34, the output of which is connected through the normally closed contacts of a contact set 62, contact sets 60 and 62 being operated by relay 50. Circuit 34 can be the same as used in the embodiment of FIG. 1. As in the circuit of FIG. 1, when relay 50 is energized lamp 38 is connected through contact set 62 to ballast reactor 18 and the battery is disconnected from the inverter/ballast circuit 34 because contact set 60 is open. Relay 50 is energized by the flow of charging current from the rectifier to the battery and, since it is on the output side of the recifier, is a low-voltage DC relay.

FIG. 2 also shows an additional lamp 66 in series with a ballast reactor 68 and connected between conductors 13 and 14. Whenever line voltage is present, the energization of lamp 66 is controlled directly by the position of switch 16.

It should be recognized that either circuit FIG. 1 or FIG. 2 can be employed without reactor 18 in which case the circuit becomes one in which the lamp 38 is illuminated only when powered by the battery through the inverter/ballast circuit.

Battery 30 can be a battery pack of a commercially available type, either nickel-cadmium or lead-acid. The length of time the lamp can be operated from battery power is, of course, a function of the size (ampere-hour capacity) of the battery pack selected. However, it will be observed that the battery power is used only to operate the inverter circuit and the lamp and is not used to operate relays or any other high-current components.

While certain advantageous embodiments have been chosen to illustrate the invention it will be understood by those skilled in the art that various changes and modifications can be made therein without departing from the scope of the invention as defined in the appended claims.

What is claimed is:

1. An emergency lighting circuit for keeping a lamp energized in the absence of power line voltage comprising
   a discharge lamp;
   a high frequency inverter circuit having an input and an output;
   first circuit means for supplying power to said lamp from one of said output of said inverter circuit and said power lines supplying the line voltage;
   a normally closed contact set;
   a rechargeable battery connected to said input of said inverter circuit through said contact set; and
   a full wave rectifier, a ballast reactor and a relay winding connected in series circuit relationship with said battery across said power lines, said relay operating said contact set so that when line voltage is present said relay is energized and said battery is charged with said contact set open, energizing said lamp through said first circuit means from said power lines and so that failure of line voltage causes said relay to be deenergized, closing said contact set and resulting in inverter operation of said lamp.

2. a circuit according to claim 1 and including
   a second ballast reactor connected to a first power conductor;
   and wherein said first circuit means further includes a second contact set operatively associated with said relay winding for switching one terminal of said lamp between said inverter output and said second ballast for connection to said first conductor when line voltage is present to energize said lamp; and
   said light circuit further includes switch means in said first conductor between the connections thereto of said series circuit and said second ballast reactor for controlling energization of said lamp when line voltage is present.

3. A circuit according to claim 1 wherein said relay winding is connected in series circuit relationship with said ballast reactor and the input of said rectifier.

4. A circuit according to claim 3 and further comprising a manually operable, normally closed test switch between the output of said rectifier and the input of said battery, and a test lamp connected in parallel circuit relationship with said test switch to illuminate to indicate the presence of battery charging current when said test switch is opened.

5. A circuit according to claim 4 wherein said relay comprises a low-voltage AC relay.

6. A circuit according to claim 4 wherein said first circuit means includes a capacitor between said second conductor and said inverter circuit to provide a high frequency path between said inverter circuit and said lamp and to block line frequency from said inverter circuit.

7. A circuit according to claim 1 wherein said relay winding is connected in series circuit relationship between the output of said rectifier and said battery.

8. A circuit according to claim 7 and further comprising third circuit means including a low-power indicator lamp means connected in parallel circuit relationship with said relay winding for indicating the presence of charging current, and a normally open, manually operable test switch connected across said rectifier input.

9. A circuit according to claim 8 wherein said first circuit means includes a capacitor between said second conductor and said inverter circuit to provide a high frequency path between said inverter circuit and said lamp and to block line frequency from said inverter circuit.

* * * * *